United States Patent [19]  
Mares et al.

[11] 4,209,610  
[45] Jun. 24, 1980

[54] PARTIALLY FLUORINATED ESTERS OR AMIDE/ESTERS OF BENZENE POLYCARBOXYLIC ACIDS, AND DYEABLE PET AND NYLON FIBERS INCORPORATING THE SAME AND PROCESS OF MAKING SUCH FIBERS

[76] Inventors: Frank Mares, 32 Valley Forge Dr., Whippany, N.J. 07981; Bryce C. Oxenrider, 41 Circle Rd., Florham Park, N.J. 07932; Cyril Woolf, deceased, late of Morristown, N.J.; by Helga Woolf, executrix, 104 James St., Morristown, N.J. 07960

[21] Appl. No.: 861,372

[22] Filed: Dec. 16, 1977

Related U.S. Application Data

[63] Continuation-in-part of Ser. No. 677,357, Apr. 15, 1976, abandoned, which is a continuation-in-part of Ser. No. 591,929, Jun. 30, 1975, abandoned.

[51] Int. Cl.² ............... C08G 63/12; C08G 69/44; C11C 3/00  
[52] U.S. Cl. .................. 260/40 R; 8/115.5; 260/404; 260/404.5; 260/404.8; 260/410.6; 260/42.44; 427/212; 427/222; 106/2  
[58] Field of Search ............. 260/404, 404.5 F, 404.8, 260/410.6, 75 NP, 75 N, 75 H, 78 SC, 75 NE; 427/212, 222; 8/115.5

[56] References Cited

U.S. PATENT DOCUMENTS

| | | | |
|---|---|---|---|
| 3,171,861 | 3/1965 | Ahlbrecht | 260/633 |
| 3,514,487 | 5/1970 | Anello et al. | 260/614 |
| 3,547,861 | 12/1970 | Anello et al. | 260/89.5 |
| 3,562,310 | 2/1970 | Anello et al. | 260/457 |
| 3,646,153 | 2/1972 | Oxenriber et al. | 260/78 S |
| 3,657,320 | 4/1972 | Anello et al. | 260/471 C |
| 3,697,564 | 10/1972 | Anello et al. | 260/408 |
| 3,819,668 | 6/1974 | Jaeger | 260/408 |
| 3,825,575 | 7/1974 | Jaeger | 260/408 |
| 3,860,613 | 1/1975 | Jaeger | 260/408 X |
| 3,870,748 | 3/1975 | Katsushima et al. | 260/475 F |
| 4,063,024 | 12/1977 | Sandler | 260/404.5 F X |

*Primary Examiner*—Floyd D. Higel

[57] ABSTRACT

Polycarboxybenzenes esterified with certain partially fluorinated alcohols and with hydroxyl-containing organic radicals such as 2-hydroxyethyl, glyceryl and chlorohydryl or bromohydryl, leaving no free carboxy groups, when incorporated with PET or nylon fibers as by contact in a liquid medium, these compounds concentrate at the fiber surface especially if the fiber is annealed (heated without abrading above its $T_g$). A relatively durable oil and water repellency is thus imparted to the fiber; which durability can be enhanced by contacting said compound in situ in the fiber with a polyepoxide or polyisocyanate.

Alternatively, partially fluorinated N,N-disubstituted amides, esterified also with the same above-cited hydroxyl-containing organic radicals, can be used. The resulting fibers can be dyed, after or together with said treatment imparting repellency.

15 Claims, No Drawings

PARTIALLY FLUORINATED ESTERS OR AMIDE/ESTERS OF BENZENE POLYCARBOXYLIC ACIDS, AND DYEABLE PET AND NYLON FIBERS INCORPORATING THE SAME AND PROCESS OF MAKING SUCH FIBERS

CROSS REFERENCE TO RELATED APPLICATIONS

This application is a continuation-in-part of our co-pending application Ser. No. 677,357 filed Apr. 15, 1976, now abandoned, as a continuation-in-part of our application, the copending, Ser. No. 591,929, filed June 30, 1975, now abandoned.

BACKGROUND OF THE INVENTION

This invention relates to fluorinated compositions or compounds, effective to impart water and oil repellency to thermoplastic fibers of polyethylene terephthalate (hereinafter called "PET") or of synthetic long-chain polyamide having recurring polyamide groups as an integral part of the polymer chain (hereinafter called "synthetic linear polyamide" or "nylon"). Such materials function as anti-soil agents.

Polymeric compounds containing fluorinated groups are broadly known for use as anti-soil agents in such articles. In particular, fluorinated polyacrylics, and production thereof, are disclosed in U.S. Pat. Nos. 3,171,861 of Mar. 2, 1965 to Ahlbrecht and 3,514,487 of May 26, 1970 and 3,547,861 of Dec. 15, 1970 both to Anello et al. The fluorinated moiety in the acrylics is derived from a fluorinated alcohol having a perfluoroalkyl group or a fluorinated alkoxy group attached to an alkanol. These polymeric compounds are not in general suitable for application to fibers before use thereof in manufacture of textile fabric, because such additives tend to flake off from a fiber during its processing and conversion to a textile fabric. These polymeric additives should instead be applied to the fabric. Moreover such application should be subsequent to the dyeing of the fabric since such additive may interfere with dyeing.

Furthermore, these polymeric compounds form an immobile coating on the fibers of the fabric. Accordingly, if this coating is disrupted, there is no way that it can restore itself.

It has been proposed to overcome such problems by use of an agent having groups compatible with the fiber-forming polymer and also groups which repel oil and water, thereby providing an amphipathic compound which is compatible with the fiber melt and will migrate to the fiber surface upon exposure to a temperature above the polymer glass transition temperature. In particular, in U.S. Pat. No. 3,646,153 of Feb. 29, 1972 to Oxenrider et al. such compounds are disclosed, including, at col. 3, lines 57-75 and col. 7, lines 47-66, a dicarboxy diamide derived from pyromellitic acid. Such compounds are useful anti-soil agents, but tend to be removed from the fiber on laundering because of the solubility in soap solutions imparted to these compounds by their substituent carboxy groups.

Also of interest in connection with the present invention is U.S. Pat. No. 3,870,748 of Mar. 11, 1975 to Katsushima et al. pertaining to anti-soil agents from acids such as trimellitic and pyromellitic acids esterified by fluorinated alcohols containing hydroxyl substituents in addition to fluorine.

SUMMARY OF THE INVENTION

In accordance with the present invention, anti-soil agents are provided which have a high degree of repellency for both water and oil, and which are retained on and in a PET and a nylon fiber through numerous launderings and dry cleanings. The compounds of the invention are amphipathic and behave, with PET and nylon when heated above their glass transition temperatures, in the manner of surface active agents, imparting low surface energy and high water and oil repellency to fibers thereof. We believe this effect is due to asymmetry in the attachment, in the compound, of at least two strongly hydrophobic and oleophobic fluorinated substituent radicals and at least one additional substituent which imparts compatibility with the PET and nylon resins. Additionally, such latter substituents are sufficiently polar so that the compound is not readily soluble in aqueous soap solutions or in chlorinated hydrocarbon dry cleaning solvents.

The subject compounds can be incorporated with the raw or partially finished fiber by surface contact therewith, as a solution or dispersion in a liquid medium; or also by blending in the melt of the resin. When incorporated by surface contact or by melt blending, these compounds have sufficient compatibility with the resin so that upon heating of the treated fiber, the compound forms a homogeneous mixture with the resin, as observed from photomicrographs; yet the incompatibility imparted by the fluorinated groups, and the mobility of these compounds, is sufficient to cause the compounds to concentrate at the surface of the fiber and to migrate toward the surface, making the fiber hydrophobic and oleophobic. If the surface has been disrupted, as by abrasion, the compounds can thereafter be caused to migrate within the resin by heating, so as to restore the anti-soil character of the surface. Again as a consequence of their ability to migrate in the fiber when it is heated and their tendency to concentrate at the fiber surface, the compounds allow satisfactory dyeing of a fiber, or article prepared from such fiber, in which these agents have been previously incorporated; and can also be applied together with a dyestuff from the same bath, with satisfactory results.

Moreover the compounds of the invention have sufficiently low solubility in aqueous soap solutions and in dry cleaning solvents to resist their removal from the fiber by laundering and by dry cleaning.

The compounds of our present invention have the general formula

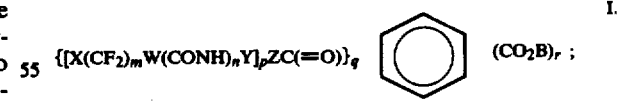

I.

attachment of the fluorinated radicals and the radicals ($CO_2B$) to the nucleus is in asymmetrical positions with respect to rotation about the axis through the center of the nucleus; wherein "X" is fluorine or perfluoroalkoxy of 1 to 6 carbon atoms and m has arithmetic mean between 2 and 20; n is zero or unity; "W" and "Y" are alkylene, cycloalkylene or alkyleneoxy radicals of combined chain length from 2 to 20 atoms; $(CF_2)_m$ and "Y" have each at least 2 carbon atoms in the main chain; "Z" is oxygen and p is 1, or "Z" is nitrogen and p is 2; q is an integer of at least 2 but not greater than 5; "B" is $CH_2RCHOH$ or is $CH_2RCHOCH_2RCHOH$ where "R" is hydrogen or methyl; or "B" is CH₂CH(OH)CH₂Q where Q is halogen, hydroxy, or nitrile; or "B" is CH₂CH(OH)CH₂OCH₂CH(OH)CH₂Q; and r is an integer of at least 1 but not greater than q; and X(CF₂)ₘ, W and Y are straight chains, branched chains or cyclic; and wherein the substituent chains of the above general formulas are the same or different; said compound being capable, upon contact thereof—as a solution or dispersion—with fibers of polyethylene terephthalate or of nylon and heating, of imparting water and oil repellency to such fibers.

To a limited extent, the segments in the above compounds designated "X" and "CF₂" can contain substituents other than fluorine, e.g. another halide or hydrogen, so long as this does not unduly affect their amphipathic character or repellency.

Our invention includes also PET and nylon fibers, especially nylon-6 and nylon-66 fibers, having incorporated therewith at least one compound as above defined; in particular, dyeable fibers; and process of producing such fiber comprising contacting such fiber with a liquid emulsion, dispersion or solution containing at least one compound as above defined, and thereafter heating the fiber sufficiently to develop water and oil repellency thereof which is retained at least in substantial part after three standard dry cleaning cycles and after three standard home laundering cycles.

A further feature of our invention comprises insolubilizing the compounds of the invention in situ in a fiber, especially in fibers composing a fabric, by bringing about reaction between hydroxyl groups in the radical B and a polyfunctional epoxide or polyfunctional isocyanate contacted with our compound in situ in the fiber.

DESCRIPTION OF PREFERRED EMBODIMENTS

Preferred compounds of this invention, in view of their availability and effectiveness are trimellitates and pyromellitates. They can be represented by the following formulas, wherein A and A' represent the same or different radicals X(CF₂)ₘW(CONH)ₙY of Formula I above, and wherein each A and A' radical has a main chain containing at least six carbon atoms and contains at least four perfluorinated carbon atoms in the radical:

II.

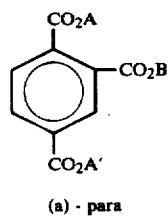

(a) - para and/or

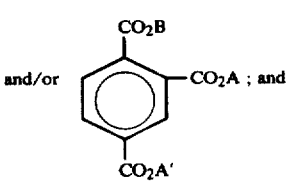

; and (b) - meta

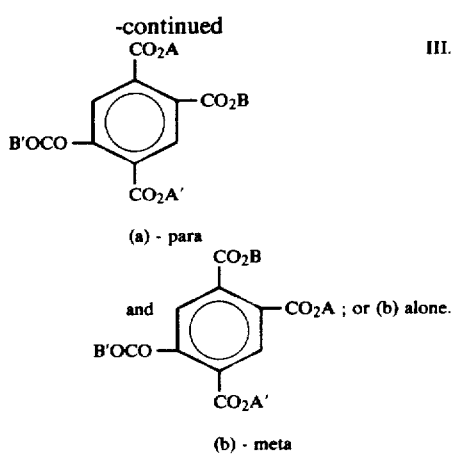

(a) - para and

; or (b) alone.

(b) - meta

The above fluorinated radicals A, A' are likewise preferred in the various other compounds of the invention, in particular in bis(diamide)/esters of trimellitic acid and of pyromellitic acid in accordance with this invention.

Compounds in accordance with our invention which are more particularly preferred are mixtures of substituted pyromellitic acid or trimellitic acid position isomers especially mixtures of the para and meta pyromellitate position isomers, represented by formulas III (a) and (b) above, with A = A' and B = B'—containing at least six perfluorinated carbon atoms in each radical A, and not over four other chain atoms therein; especially such mixtures containing about 50:50 molar proportions of each of the two position isomers of Formulas III. The attachment of the radicals in the para isomer (see Formula III (a) above) is symmetrical with respect to rotation 180° about the axis through the center of the nucleus. This isomer, used alone, shows relatively low repellency. Nevertheless when the para isomer is mixed in about 50:50 molar ratio with the meta isomer (which is unsymmetrical with respect to rotation about such axis), the mixture shows repellency essentially equal to the good repellency of the substantially pure meta isomer used alone in the same amount. The corresponding bis(diamide)/esters of the substituted acids are likewise preferred.

It will be appreciated that although overall the radicals A and A' will both be the same and the radicals B and B' will both be the same in preferred compounds of the invention, they may nevertheless vary within individual molecules because a mixture of fluorinated alcohols will generally be used to obtain the fluorinated radicals A, and because epoxides used to obtain the radicals B may react further to form dimers or higher polymers of the B radicals.

In especially preferred radicals A and A', the fluorinated moiety has the formula F(CF₂)ₘ or (CF₃)₂CFO(CF₂)ₘ', where m independently at each occurrence has any integral value from 5 to 9, and m' independently at each occurrence has any integral value from 2 to 16, and (CF₂)ₘ and (CF₂)ₘ' are straight chains.

Preferred radicals B and B' are CH₂CH₂OH, CH₂CH(OH)CH₂Cl, CH₂CH(OH)CH₂OH and CH₂CH(OH)CH₂Br.

A particular feature of the preferred B radicals is that they contain hydroxyl groups, which groups can be utilized for in situ insolubilization of the compound in a fabric, by introducing a polyfunctional epoxide or polyfunctional isocyanate in solution, together with tertiary amine catalyst, and heating to bring about reaction with such hydroxyl groups.

The fluorinated radicals in the compounds of this invention are provided in general by reaction between a benzene polycarboxylic acid anhydride or carboxy chloride/anhydride, which can be additionally substituted in the benzene ring, and an appropriate fluorinated alcohol or amine. The corresponding carboxylic acid/half ester containing a fluorinated esterifying radical and a carboxy group is produced from the anhydride group reacting with an alcohol; or when the compound is an amide rather than an ester, the appropriate fluorinated amine is used as reactant instead of the alcohol, with production of a fluorinated amido group and a carboxy group. All free carboxy groups can then be esterified by base-catalyzed reaction with the epoxide corresponding to the desired "B" group in the compound.

When, as with tricarboxy- or pentacarboxybenzene starting material, the anhydride reactant contains one or more carboxy groups, the reaction with fluorinated alcohol or amine will produce fewer fluorinated substituents than the total of carboxy substituents originally present plus those formed in such reaction. Such carboxy/anhydride reactants accordingly are converted first to the carboxy chloride (i.e. the formyl chloride)/anhydride; and this is converted to a carboxylic acid/fluorinated ester (or amide) which is then further reacted as above:

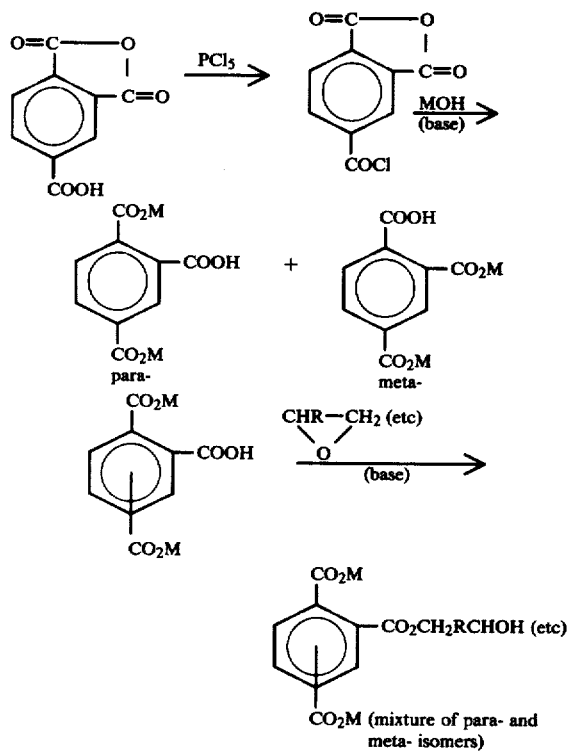

where "etc" indicates other epoxy precursors of the B radicals, and such other B radicals.

When the benzene polycarboxylic acid starting material is the 1,3,5 isomer (i.e. trimesic acid), this can be used in the form of trimesoyl trichloride, which is converted to a mixture of fluorinated isomeric compounds by reaction with less than three molar proportions of fluorinated alcohol or amine; and the unreacted carboxy chloride groups are converted to the desired ester groups B by reaction with the appropriate alcohol, i.e. ethylene glycol, propylene glycol, glycerol, chlorohydrin, etc. in presence of a base.

The desired fluorinated reactant, having n=0, i.e. no amide group between $(CF_2)$ and Y, can be prepared from the corresponding iodide by known methods. For example, fluorinated alcohols can be prepared as described in U.S. Pat Nos. 3,171,861 of Mar. 2, 1965; 3,514,487 of May 26, 1970 and 3,646,153 of Feb. 29, 1972 all above cited; and in Example 7 of U.S. Pat. No. 3,562,310 of Feb. 9, 1971 to Anello et al. Numerous illustrative examples of such fluorinated iodides are disclosed in those and other patents, most or all of which we consider to be operative to produce compounds useful in the present invention.

Another route to fluorinated alcohols to be used as above noted is via production of an ester of a fluorinated acid followed by reduction of the ester with a mild reducing agent. The acids for use in such route can be obtained as indicated in these patents and also by hydrolysis of nitriles, obtainable from iodides as indicated e.g. in U. S. Pat. No. 3,646,153 (above cited) at col. 7, lines 10–42.

Fluorinated acids are also the starting materials when the fluorinated substituents, represented in Formula I by $[X(CF_2)_mW(CONH)_nY]$, have a value of unity for n. To prepare those substituents, a fluorinated acid ester of formula $X(CF_2)_mWCOOAlk$ is used, where "Alk" is chosen to form an alcohol which can easily be separated from the subsequent amide product. "W" in the formula is as in Formula I above, or can be absent. Such ester, or the parent acid corresponding thereto, is heated with an amino alcohol, thereby forming an amido alcohol as the product. A specific example is $(CF_3)_2CFOCF_2CF_2CH_2CH_2CONHCH_2CH_2CH_2OH$ (U.S. Pat. No. 3,697,564 of Oct. 10, 1972 to Anello et al., Ex. XXVI at col. 15–16). Such amido alcohol forms a carboxylic acid/amido half ester upon reaction with an anhydride of a polycarboxybenzene.

Upon reaction with a diamine instead of an amino alcohol, an amido amine will be obtained, from which an amido amide is formed with a polycarboxybenzene anhydride.

Formation of amide half ester (Formula IV):

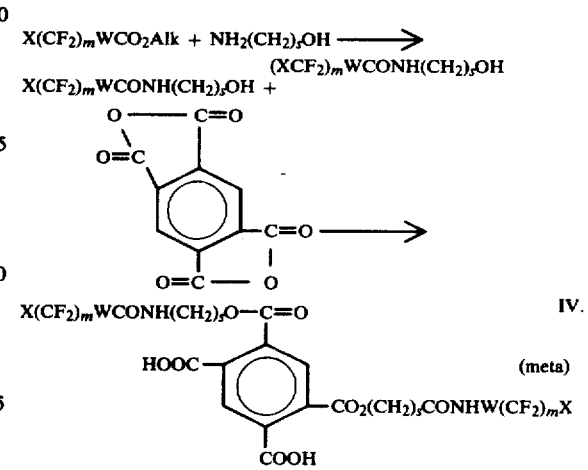

and also the para isomer. In general in these compounds, s is an integer from 1 to 20, preferably from 1 to 6.

When the fluorinated radical is to be prepared from a secondary iodide rather than from a primary iodide, then the procedure of the above cited U.S. Pat. Nos. 3,514,487 and 3,562,310 for converting an iodide to an alcohol, using oleum or $SO_3$, should be carried out employing liquid sulfur dioxide reaction medium. Such procedure is described in detail in U.S. application Ser. No. 591,930 of Mares et al. filed June 30, 1975 and now abandoned.

Fluorinated amines for use in amide formation with polycarboxybenzene anhydride and/or carboxy chloride groups can be obtained for example by reduction of fluorinated nitriles. See U.S. Pat. No. 3,646,153 at col. 7, lines 10–42.

As above indicated, the radicals designated by B and B' in the above formulas are generally provided by reaction of carboxy groups with epoxides. For introducing glyceryl radical or halohydryl radical, an alternative is to heat the carboxy compound with a chlorohydrin in presence of potassium hydroxide, then hydrolyze to produce glyceryl radical, or add hydrogen halide to the epoxy groups to produce halohydryl radical.

When the B radical is to be from dialkylene glycol or from diglycidol, the radical can be obtained by reaction of the appropriate epoxy compound with the terminal hydroxy group of the glycol or glyceryl pyromellitate ester, employing a basic catalyst such as a tertiary amine.

Illustrative of some of the more readily available compounds in accordance with our invention are the following specific compounds. It is to be understood that as normally prepared, these compounds are mixed para and meta isomers with respect to position of the fluorinated groups; and may have mixed chain lengths of the fluorinated radical A; and may include minor proportions of the diglyceryl radical when radical B is glyceryl.

The chains in the formulas below are straight chains unless otherwise indicated.

Trimellitates:

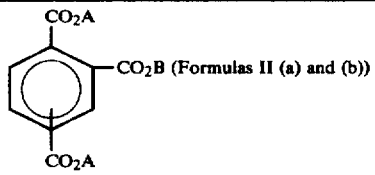

| | Radical A | Radical B |
|---|---|---|
| 1. | $-CH_2CH_2CF_2CF_2OCF(CF_3)_2$ | $-CH_2CH_2OH$ |
| 2. | " | $-CH_2CH(OH)CH_2Cl$ |
| 3. | " | $-CH_2CH(OH)CH_2OH$ |
| 4. | $-CH_2CH_2(CF_2)_4OCF(CF_3)_2$ | " |
| 5. | $-CH_2CH_2(CF_2)_5CF_3$ | " |
| 6. | " | $-CH_2CH(OH)CH_2Br$ |
| 7. | $-CH_2CH_2(CF_2)_7CF_3$ | $-CH_2CH(OH)CH_2OH$ |
| 8. | $-CH_2CH_2(CF_2)_7CF_3$ | $-CH(CH_3)CH_3OH$ |
| 9 | " | $-CH_2OH(OH)CH_2OCH_2CH(OH)CH_2OH$ |
| 10. | $-(CH_2)_7(CF_2)_7CF_3$ | $-CH_2CH_2OCH_2CH_2OH$ |

Pyromellitate tetraesters

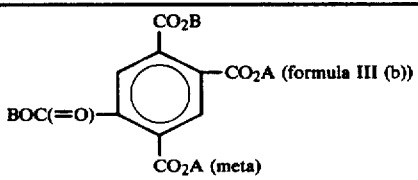

(The para isomer, Formula III (a) above, will also normally be present in equal proportion with the above meta isomer).

| | Radical A | Radical B |
|---|---|---|
| 11. | $-CH_2CH_2CF_2CF_2OCH(CF_3)_2$ | $-CH_2CH_2OH$ |
| 12. | " | $-CH_2CH(OH)CH_2Cl$ |
| 13. | " | $-CH_2CH(OH)CH_2OH$ |
| 14. | $-CH_2CH_2(CF_2)_4OCF(CF_3)_2$ | $-CH_2CH_2OH$ |
| 15. | " | $-CH_2CH(OH)CH_2Br$ |
| 16. | " | $-CH_2CH(OH)CH_2Cl$ |
| 17. | $-CH_2CH_2(CF_2)_5CF_3$ | " |
| 18. | " | $-CH_2CH(OH)CH_2OH$ |
| 19. | " | $-CH_2CH_2OCH_2CH_2OH$ |
| 20. | $-CH_2CH_2(CF_2)_7CF_3$ | $-CH_2CH(OH)CH_2Cl$ |
| 21. | " | $-CH_2CH(OH)CH_2Br$ |
| 22. | $-CH_2CH_2(CF_2)_9CF_3$ | $-CH_2CH(OH)CH_2Cl$ |
| 23. | $-(CH_2)_3(CF_2)_9CF_3$ | " |
| 24. | $-CH(CH_3)CH_2(CF_2)_7CF_3$ | " |
| 25. | $-CH_2)_4CF(CF_3)CF_2OCF(CF_3)_2$ | $-CH_2CH_2OH$ |
| 26. | $-CH_2CHCH_2CF_2CFCF_2OCH(CF_3)_2$<br>             \|         \|<br>            $CH_3$     $CF(CF_3)_2$ | $-CH_2CH(OH)CH_2Cl$ |
| 27. | $-CH_2)_{11}(CF_2)_{16}OCF(CF_3)_2$ | " |
| 28. | $-CH_2CH_2NHCO(CF_2)_8CF_3$ | " |
| 29. | $-CH_2)_{16}NHCO(CF_2)_{16}OCF(CF_3)_2$ | " |
| 30. | $-CH_2CH_2CH_2NHCO(CH_2)_2OCF(CF_3)_2$ | " |
| 31. | $-CH(CH_2CH_2CH_3)CH_2CH_2(CF_2)_7CF_3$ | $-CH_2CH(OH)CH_2OH$ |
| 32. (a) | $-CH_2CH_2CH_2CH(CH_2CH_3)(CF_2)_7CF_3$ and | " |

-continued

| | |
|---|---|
| (b) $-CH_2CH_2CH(CH_2CH_2CH_3)(CF_2)_7CF_3$ | |
| 33. $-CH_2CH_2OCH_2CH_2CH_2(CF_2)_9CF_3$ | $-CH_2CH(OH)CH_2OH$ |
| 34. 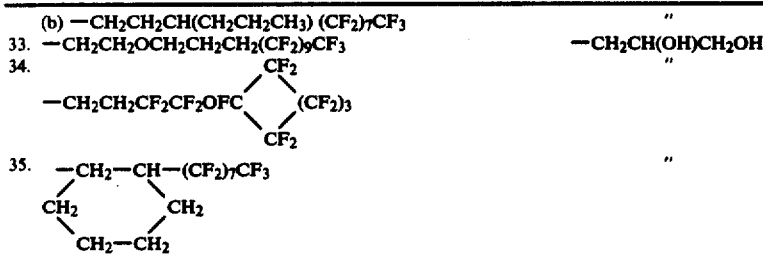 | " |
| 35. $-CH_2-CH-(CF_2)_7CF_3$ <br> $\quad\;\;CH_2\quad\;\;\;CH_2$ <br> $\quad\quad\;CH_2-CH_2$ (cyclohexyl ring) | " |

Pyromellitic Bis(N-distritutedamide)

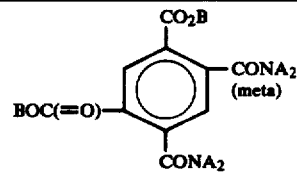

(The para isomer will also normally be present in equal proportion)

| Radical A | Radical B |
|---|---|
| 36. $-CH_2CH_2CH_2CF_2CF_2OCF(CF_3)_2$ | $-CH_2CH_2OH$ |
| 37. $-(CH_2)_4CF_2)_7CF_3$ | $-CH_2CH_3OH$ |
| 38. $-CH_2CH_2CH_2CF_2CF_2OCF(CF_3)_2$ | $-CH_2CH(OH)CH_2OH$ |
| 39. $-CF_2)_5CF_3$ | $-CH_2CH(OH)CH_2CH_2Cl$ |
| 40. $-CH_2CH_2(CF_2)_5CFCF_2CF_3$ <br> $\quad\quad\quad\quad\;\;\;\;\;\;|$ <br> $\quad\quad\quad\quad\;\;\;\;\;\;CF_3$ | $-CH_2CH(OH)CH_2Br$ |
| 41. $-CH_2CH_2NHCO(CF_2)_8CF_3$ | $-CH_2CH(OH)CH_2Cl$ |

Among the radicals A of the above exemplary compounds, the following can be prepared from special starting materials as indicated below:

No. 10—$(CH_2)_7(CF_2)_7CF_3$: From 7-perfluorooctyl heptanol (U.S. Pat. No. 3,171,861 Ex. 2 at col. 6, lines 25–35);

No. 23—$(CH_2)_3(CF_2)_9CF_3$: From 1-iodoperfluorodecane addition to allyl alcohol, catalyzed by a free-radical forming catalyst such as benzoyl peroxide or azobis(isobutyronitrile); and subsequent reduction by zinc and acetic acid or alcohol to remove the iodo substituent. (U.S. Pat. No. 3,562,310 at col. 3, lines 59–66).

No. 25—$(CH_2)_4CF(CF_3)CF_2OCF(CF_3)_2$: From 2-iodo, 3-perfluoroisopropoxyperfluoropropane addition to 1,3-butadiene followed by hydrogenation (see U.S. Pat. No. 3,514,487, col. 4, lines 32–33).

No. 26

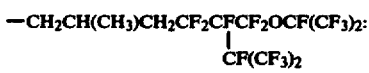

From addition of the perfluoro iodide to methallyl alcohol (see No. 23 above).

No. 27—$(CH_2)_{11}(CF_2)_{16}OCF(CF_3)_2$: From addition of the perfluoro iodide to 10-undecenoic acid methyl ester and reduction by zinc and acetic acid to remove the iodo substituent (U.S. Pat. No. 3,697,564, Ex. XXXI at col. 18), then reduction of the ester to the alcohol by lithium aluminum hydride in ether (see U.S. Pat. No. 3,547,861 at col. 5, lines 40–42).

No. 28—See Example IX below.

No. 30—$(CH_2)_3$-$NHCO(CH_2)_2(CF_2)_2OCF(CF_3)_2$: From $(CF_3)_2CFO(CF_2)_2(CH_2)_2I$ by conversion to the nitrile (U.S. Pat. No. 3,697,564 Ex. V at col. 9); hydrolysis to acid (ibid., Ex. X at Col. 11); and amide formation with 3-aminopropanol (ibid. Ex. XXVI at col. 15).

No. 31—$CH_2(CH_2CH_2CH_3)CH_2CH_2(CF_2)_7CF_3$: From addition of the perfluoro iodide to 1-hexen-3-ol and reduction by zinc-acetic acid.

No. 32 (a)—$CH_2CH_2CH_2CH(CH_2CH_3)(CF_2)_7CF_3$, and its isomer 32(b): From addition of the perfluoro iodide to 3-hexen-1-ol and reduction by zinc-acetic acid.

No. 33—$CH_2CH_2OCH_2CH_2CH_2(CF_2)_9CF_3$: From the iodide $CF_3(CF_2)_9I$ plus allyl alcohol, and removal of the iodo substituent from the resulting alcohol, as for No. 23 above; then addition of that alcohol to ethylene oxide in presence of a base such as a tertiary amine.

No. 35

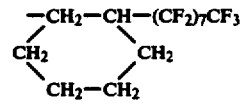

from addition of the perfluoro iodide to cyclohexene and conversion of the resulting secondary iodide to secondary alcohol via oleum or sulfur trioxide generally as in Exs. V and VII below but conducted in liquid $SO_2$ reaction medium.

The following specific examples are illustrative of the fiber additives of our invention and of the best mode contemplated by us of preparing such additives and fibers incorporating the same, but are not considered to be limiting thereof. In particular, we consider that instead of the trimellitic and pyromellitic compounds of these examples, like compounds from other tricarboxy and tetracarboxy benzenes, and from pentacarboxy and hexacarboxybenzene can be similarly prepared and will give broadly similar results in terms of repellency conferred on fibers by incorporation of the compounds with the fiber surface.

The below preparative examples are grouped by type of compound and show the compounds numbered to correspond to the list of illustrative compounds above set out.

(A) Trimellitates

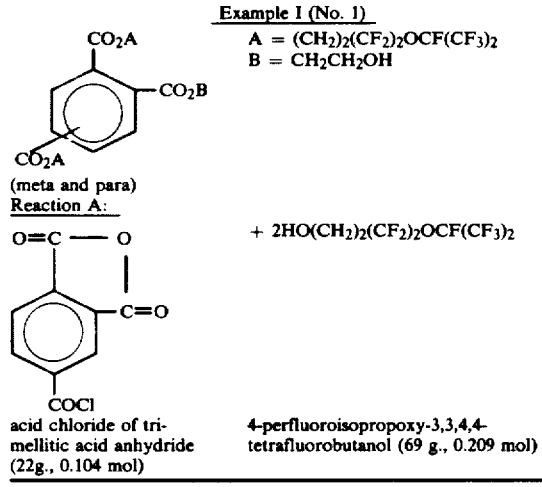

Example I (No. 1)

A = $(CH_2)_2(CF_2)_2OCF(CF_3)_2$
B = $CH_2CH_2OH$

Reaction A:

acid chloride of trimellitic acid anhydride (22g., 0.104 mol)  +  4-perfluoroisopropoxy-3,3,4,4-tetrafluorobutanol (69 g., 0.209 mol)

Conditions: 10 ml pyridine, benzene solvent (100 ml), heat 2 hours at 80° C. and stir overnight at room temp.

Intermediate: Fluorinated isopropoxybutyl diester of trimellitic acid (about 87 g, viscous oil). Structure confirmed by nmr analysis and titration for —COOH.

Reaction B:

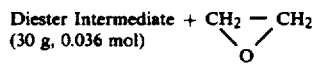

Diester Intermediate + $CH_2$—$CH_2$ (30 g, 0.036 mol) with O bridge

Conditions: To the diester, add 15 ml dimethylformamide (DMF) and 1 ml triethylamine (2 N in DMF) as catalyst of ester formation, evacuate and pressurize with ethylene oxide to 1200 mm Hg. Stir at 48° C. until uptake of ethylene oxide ceases (about 24 hours).

Work-up: Pour into water, extract into chloroform, wash with HCl (3% aq.) and then with water. Dry over MgSO$_4$ and evaporate at 60° C./1 mm Hg. Product = about 22 g (oil). Structure confirmed by IR spectrogram, nmr analysis and elemental analysis for C, H, F.

EXAMPLE II (NO. 2)

Same formula as Ex. I, except B = $CH_2CH(OH)CH_2Cl$

Reaction A: Same as Ex. I.

Reaction B:

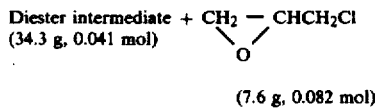

Diester intermediate + $CH_2$—$CHCH_2Cl$ (34.3 g, 0.041 mol) with O bridge (7.6 g, 0.082 mol)

Conditions: 42 hr. at 50°-55° C. in 30 ml dry acetone using 0.2 ml triethylamine catalyst.

Work-up: Flash evaporate the solvents. Product = 34.7 g (oil).

EXAMPLE III (NO. 3)

Same formula as Ex. I, except B = $CH_2CH(OH)CH_2OH$

About 20 g of the product of Example II is dissolved in 40 ml acetonitrile and a 1:1 molar proportion of NaOH (50% aq.) is added, immediately forming a ppt. of NaCl. The mixture is brought to neutrality with H$_2$SO$_4$ (10% aq.) and then is dried over MgSO$_4$. The salts are filtered off and the volatiles are evaporated off in vacuo. About 18 g of oil is recovered as product, having nmr analysis consistent with the desired structure (No. 3).

EXAMPLE IV (No. 4)

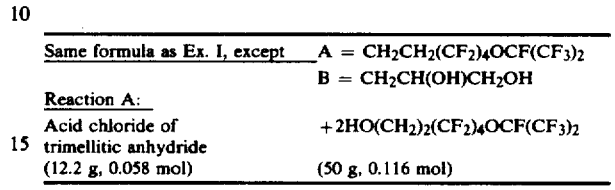

| Same formula as Ex. I, except | A = $CH_2CH_2(CF_2)_4OCF(CF_3)_2$ |
| --- | --- |
| | B = $CH_2CH(OH)CH_2OH$ |
| Reaction A: | |
| Acid chloride of trimellitic anhydride (12.2 g, 0.058 mol) | +2HO(CH$_2$)$_2$(CF$_2$)$_4$OCF(CF$_3$)$_2$ (50 g, 0.116 mol) |

Conditions: As for Ex. I

Work-up: As for Ex. I. Diester structure was confirmed by nmr analysis and titration for —COOH by alcoholic KOH.

Reaction B: Diester intermediate + glycidol (24.6 g, 0.0238 mol) (4.4 g, 0.059 mol)

Conditions: 5 hr. at 60° C. in 20 ml acetonitrile using 1 mmol triethylamine catalyst.

Work-up: Evaporate off the volatiles; dissolve residue in ether. Wash with HCl (3% aq.), then with water, then with NaHCO$_3$ (aq.); dry over MgSO$_4$; and evaporate off the volatiles. Product = 17.5 g (oil); structure confirmed by nmr analysis and elemental analysis for C, H, F.

EXAMPLE V (NO. 5)

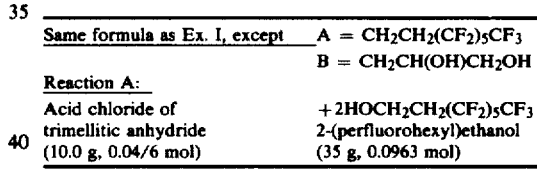

| Same formula as Ex. I, except | A = $CH_2CH_2(CF_2)_5CF_3$ |
| --- | --- |
| | B = $CH_2CH(OH)CH_2OH$ |
| Reaction A: | |
| Acid chloride of trimellitic anhydride (10.0 g, 0.04/6 mol) | +2HOCH$_2$CH$_2$(CF$_2$)$_5$CF$_3$ 2-(perfluorohexyl)ethanol (35 g, 0.0963 mol) |

Ex. V (Note): Prep. of HOCH$_2$CH$_2$(CF$_2$)$_5$CF$_3$ (2-(perfluorohexyl)ethanol):

1400 g. of purchased n-CF$_3$(CF$_2$)$_n$I (n = 5,6,7) was vacuum distilled on a spinning band column (ca. 20 theor. plates) into the components, each practically pure per gc analysis (b.p.'s 72° C./163 mm; 102°-104° C./120 mm; 126°-128° C./78-80 mm).

The n-perfluorohexyl iodide fraction weighed 202 g. This was telomerized with ethylene by mixing with 13 g of benzoyl peroxide and stirring and flushing with ethylene for 30 min., then heating to about 70° C. when a slightly exothermic reaction occurred. The temperature gradually dropped. After 4 hours, at about 60% conversion (by gc), another portion (about 2 g) of benzoyl peroxide was added. Next day, the crude product was distilled on the spinning band column at 99° C./62 mm Hg giving about 270 g of n-CF$_3$(CF$_2$)$_5$CH$_2$CH$_2$I containing about 2% of higher telomer (per gc).

This iodide was added in ¼ hour to about 300 ml of 20% oleum heated to 75° C. The temperature rose somewhat. The mixture was heated 2 hours at 100° C., then cooled to 60° C. and about 600 g of ice was added a little at a time. Then the mixture was heated at 110° C. for 3 hours, cooled, and mixed 1:1 by volume with ether. The undissolved iodine was filtered off; and the organic layer was separated, and washed with sodium bisulfite (to remove iodine), sodium bicarbonate, and water.

After drying over $MgSO_4$ and stripping off the ether solvent, the product was distilled on the spinning band column, giving 112 g of the desired 2-(perfluorohexyl)ethanol containing 0.3% of the starting iodide (per gc).

Reaction A, Ex. V (cont)

Conditions: As for EX. I. Structure of diester intermediate confirmed by nmr analysis, elemental analysis for C,H,F and titration for —COOH by alcoholic KOH.
Reaction B: Diester intermediate + glycidol (15 g, 0.016 mol) (3.6 g, 0.0486 mol)
Conditions: As for Ex. IV
Work-up: As for Ex. IV. Product=about 12 g (oil). Yield is reduced by low solubility in ether and by formation of stable emulsions with water. Analysis by nmr is consistent with the desired structure (No. 5).

(B) Pyromellitates

Example VI (No. 11)

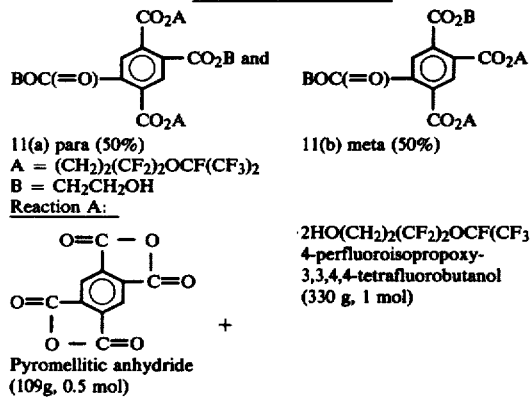

11(a) para (50%)    11(b) meta (50%)
A = $(CH_2)_2(CF_2)_2OCF(CF_3)_2$
B = $CH_2CH_2OH$
Reaction A:

2HO$(CH_2)_2(CF_2)_2$OCF$(CF_3)_2$
4-perfluoroisopropoxy-
3,3,4,4-tetrafluorobutanol
(330 g, 1 mol)

Pyromellitic anhydride
(109g, 0.5 mol)

Conditions: Heat 4 hours at 100° C. in 40 ml of dry DMF (dimethyl formide) solvent with stirring.
Work-Up: Pour into water; extract with ether (500 ml). Wash ether layer several times with water and dry over $MgSO_4$. Evap. on a rotating evaporator, then in a vacuum oven at 70°/0.2 mm Hg. Product=417 g, m.p. =123°-146° C., pyromellitic acid diester, 50:50 meta:para (by nmr); structure confirmed by IR spectrogram, elemental analysis for C,H,F and titration for —COOH by alcoholic KOH.
Reaction B:

Diester intermediate + 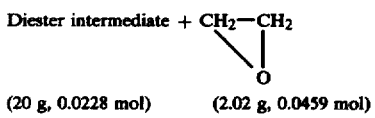

(20 g, 0.0228 mol)    (2.02 g, 0.0459 mol)

Conditions: Heat with 1.5 mmol triethyl amine catalyst in 200 ml DMF at 49° C.
Work-up: Vacuum distill to remove most of the DMF; work up residue as in Ex. I work-up. Product=19.5 g (oil); structure confirmed by IR spectrogram, nmr analysis and elemental analysis for C,H,F.

EXAMPLE VI(A) (NO. 11a)

The acid diester isomers obtained in Reaction A of Example VI are crystallized twice from chloroform, affording crystals (45 g) of para isomer (per nmr) of m.p. 160°-162° C. This intermediate (20 g) is converted to the para compound of the above formula 11 (a) by the procedure of Reaction B above. Product=21.9 g (oil), structure confirmed as para by nmr.

EXAMPLE VI(B) (NO. 11B)

The mother liquors from Example VI(a) are evaporated in vacuo and the residue is crystallized from toluene. The intermediate diester product (34 g) is meta isomer, (contaminated with about 10% of para, per nmr) of m.p. 118°-121° C. This intermediate (20 g) is converted to meta compound of the above formula 11(b) by the procedure of Reaction B above. Product=about 20 g. The reaction rate is much slower than in the above Reaction B of Ex. VI. The structure is confirmed as meta by nmr.

EXAMPLE VII (NO. 16)

| Same formula as Ex. VI, except | A = $(CH_2)_2(CF_2)_4OCF(CF_3)_2$ |
| --- | --- |
| | B = $CH_2CH(OH)CH_2Cl$ |
| Reaction A: | |
| Pyromellitic anhydride (52 g, 0.238 mol) | +2HO$(CH_2)_2(CF_2)_4$OCF$(CF_3)_2$ 6-perfluoroisopropoxy-1,1,-2,2-tetrahydroperfluoro-hexanol (200g, 0.465 mol) |

Ex. VII (Note): Prep. of the fluorinated alcohol: In a 3 liter reactor, 1,535 gms. of 4-perfluoroisopropoxyperfluorobutyl iodide is mixed with 25 gms. of benzoyl peroxide. The system is thoroughly purged with ethylene to remove oxygen, and the reaction mixture is heated to about 80° C. in an oil bath, at which temperature there is an exotherm to about 105° C. The reaction is continued for a period of 24 hours and the quantity of ethylene above the reaction mixture is maintained at an excess over that required to react with the iodide starting material. At the end of the above period, the reaction mixture is cooled to 40° C. and an additional 5 gms of benzoyl peroxide is added. The reaction is then continued at 80° C. (in the absence of oxygen) in an ethylene atmosphere for an additional 36 hours to complete the conversion, as determined by gas chromatography. The product is flashed from the benzoic acid by-product and 1,317 gms of pure product are recovered by fractionation through an 18 inch spinning band column operating at a temperature of from 62° to 64° C. and about 9 mm Hg pressure. The product is found to be the partially fluorinated iodide, 6-perfluoroisopropoxy-1,1,2,2-tetrahydroperfluorohexyliodide.

The partially fluorinated iodide (269 gms) is then added dropwise with continuous stirring over a period of 1.5 hours to 300 ml. of 20% by weight oleum at a temperature of from 60° to 70° C. The reaction mixture is then heated to a temperature of 100° C. for one hour to complete the reaction. The reaction mixture is then cooled and the excess of $SO_3$ therein is quenched by slowly adding 75 gms. of ice with continuous stirring, so as to maintain the temperature of the mixture below about 100° C.

After the $SO_3$ is quenched, as is indicated by the absence of an exotherm on the addition of ice, the resulting mixture is hydrolyzed by the slow addition of 500 ml. of cold water. Hydrolysis is completed by heating to a temperature of 100° to 110° C. for three hours.

After cooling to room temperature the product is extracted with 500 ml of ethyl ether and the ether solution is washed in sequence with several 500 ml. portions of water, a 10% by weight aqueous sodium sulfite solution, water, a 2% by weight aqueous sodium carbonate solution and two portions of water. The ether solution is then dried over magnesium sulfate and substantially all the ether is removed by flash evaporation at 25° C.

The crude product (160 parts) upon subsequent analysis by gc (gas chromatography) is found to contain about 90% by weight of a partially fluorinated alcohol, 6-perfluoroisopropoxy-1,1,2,2-tetrahydroperfluorohexanol, with the principal contaminant being the unreacted iodide. The product is purified by fractionating through an 18 inch spinning column, thereby producing 111 gms. of the pure alcohol.

Reaction A (Ex. VII Cont.)

Conditions: Heat 24 hours at 60° C. in 30 ml dry DMF with stirring, to disappearance of anhydride carbonyl (IR). Vent through DRIERITE anhydrous calcium sulfate tube.

Work-up: Add 200 ml ice and 200 ml water to crystallize product. Dry in vacuum over overnight at 70° C./1 mm Hg.

Product: 250.5 g m.p. 130°-148° C. Mixture of para and meta isomer per nmr analysis. Structure confirmed by IR spectrogram, elemental analysis for C,H,F and titration of —COOH by alcoholic KOH.

Reaction B: Diester intermediate (30.7 g)+epichlorhydrin (8.9 ml)

Conditions: Heat 30 hours at 65° C. with 0.22 ml pyridine catalyst in 40 ml dry acetonitrile with stirring, to disappearance of carboxyl per titration by alcoholic KOH.

Work-up: Flash evap. volatiles, 80° C./1 mm Hg.

Product: 34 g oil of structure above specified.

EXAMPLE VII A (NO. 15)

The bromohydrin ester with same formula as Ex. VII, except B=CH$_2$CH(OH)CH$_2$Br, is prepared from the pyromellitic acid diester intermediate of Ex. VII, Reaction A, By esterifying the two remaining carboxy groups with epibromohydrin essentially as for the above Reaction B of Ex. VII.

EXAMPLE VIII (MIXTURE OF NOS. 17, 20, 22)

Same formula as Ex. VII, except A = (CH$_2$)$_2$(CF$_2$)$_n$CF$_3$ where n = 5,7,9

Reaction A:

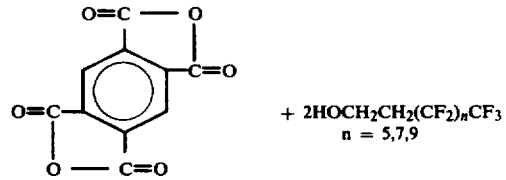

+ 2HOCH$_2$CH$_2$(CF$_2$)$_n$CF$_3$
n = 5,7,9

In a 3-liter three-necked flask fitted with stirrer, thermometer and condenser, mixed perfluoroalkylethanols (2 mols) mostly consisting of perfluorohexyl, -octyl, and -decyl ethanols, and pyromellitic acid anhydride (218 g, 1 mol) are added to 1 liter of dimethylformamide. The actual quantity of fluoro-alcohol must be calculated basis detailed analysis of the mixed telomers, but the overall mol ratio of alcohol groups to the dianhydride must be 2:1.

The mixture is heated at 45° C. for about 22 hours; titration of a DMF aliquot with alcoholic KOH to phenolphthalein endpoint indicates carboxyl concentration and extent of completion of reaction.

Reaction B: When Reaction A is complete, epichlorhydrin (4 mols) and triethylamine (0.03 mols) are added to the reaction mixture, which is then heated to 60° C. for 6 hours. The extent of reaction can be followed by titration of the remaining epoxy groups in epichlorohydrin with HBr in glacial acetic acid to crystal violet end-point.

Workup: The reaction mixture is cooled to room temperature and poured into 5 liters of water. The finely precipitated product is separated and washed by centrifugation and dried in vacuo (room temperature, 1 mm Hg.) to afford the crude product. Further purification is effected by heating an acetone solution of the product (5 liters) under reflux for five hours. On cooling, insoluble material containing unreacted carboxyl groups is filtered off. The pyromellitate tetraester product is obtained by evaporation of the filtrate.

EXAMPLE IX (NO. 28)

| Same formula as Ex. VI except | A = (CH$_2$)$_2$NHCO(CF$_2$)$_8$CF$_3$ |
| --- | --- |
|  | B = CH$_2$CH(OH)CH$_2$Cl |
| Reaction A: | |
| Pyromellitic anhydride (sublimed, 3.92 g, 0.0180 mol) | +2HO(CH$_2$)$_2$NHCO(CF$_2$)$_8$CF$_3$ N-(2-hydroxyethyl)perfluorodecanoic acid amide (20.0 g, 0.0359 mol) |

Conditions: Heat at about 47° C. overnight in 20 ml dry DMF with stirring, under nitrogen Note 1

Prep. of N-substituted ethanolamine:

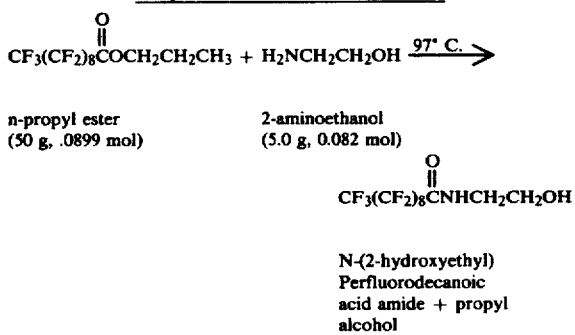

n-propyl ester (50 g, .0899 mol)

2-aminoethanol (5.0 g, 0.082 mol)

N-(2-hydroxyethyl) Perfluorodecanoic acid amide + propyl alcohol

All glassware oven dried. 3-necked 100 ml. round bottom flask fitted with magnetic stirrer, serum cap, thermometer and water condenser vented through a DRIERITE anhydrous calcium sulfate tube. Pot charged with 50.0 gms. of n-propyl ester. To this is added, via the serum cap, 5.0 gms of 2-aminoethanol over a one hour, 25 min. period. Upon addition a white ppt. forms; there is an exotherm. Pot is raised to reflux—contents is a yellow liquid. Heat at 97° C., 1.5 hrs. Place on rotary evaporation with oil bath heated to 100° C. Wgt of residue, 46.3 g. Place in vacuum oven at room temp. and pump out over ca. 40 hours. Wgt of residue, 45.9 gms, m.p.=108°-109° C. Amide structure confirmed by nmr, IR shows small amount ester. Vacuum oven overnight; IR clean of ester.

Note 2

Procedure for Reaction A: 200 ml. 3-necked round bottom flask equipped with stirrer, serum cap, thermometer, condenser; vented through bubbler. All glassware oven dried. $N_2$ atm. throughout exp. Pot charged, DMF added by syringe through serum cap. Heat to 47° C. Leave on overnight. Temp. of pot falls to 41° C. Titrate sample for COOH using DMF as solvent and KOH in benzyl alcohol. Theor=0.8387; found=0.9186 meq/gm. Sample (1.9 g) flash evaporated; leaves white solid (1.1 g) m.p.=202°-208° C. Difluoro ester-acid structure confirmed by nmr. Isomer ratio with respect to substitution around the aromatic ring is 50/50.

Reaction B:

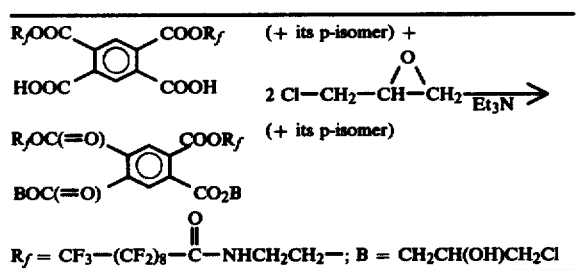

Procedure: To the product mixture from Reaction A, add 14.07 ml of epichlorohydrin and 0.15 ml. of triethylamine. Addition forms opaque top layer; this gradually dissolves and the whole becomes clear about 1.5 hrs. later. Temp. of pot is 51°-57° C. depending on height of pot in bath. Temp. falls overnight to 42° C. After cooling, forms 2 phases, one a ppt. Place on rotary evaporator with oil bath heated to 80° C. Residue wgt. 25.5 gms. Place in vacuum oven at room temp. ca. 40 hours; m.p. at 92° C. tiny droplets; gradual softening to 106° where no discrete particles are left; clear at 110° C.

EXAMPLE X (NO. 36)

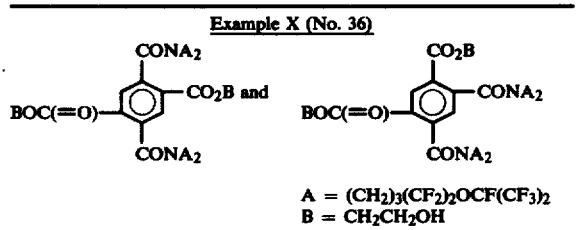

$A = (CH_2)_3(CF_2)_2OCF(CF_3)_2$
$B = CH_2CH_2OH$

Reaction A:

Pyromellitic anhydride + $2HN[(CH_2)_3(CF_2)_2OCF(CF_3)_2]_2$
(8.40g, 0.0385 mol)    (50.6 b, 0.0757 mol)
(secondary amine from fluorinated isopropoxybutyl iodide + NaCN in DMSO ⟶ nitrile; nitrile in acetic acid, hydrogenated (900 psi) over $PtO_2$ ⟶ primary secondary, tertiary amine)

Conditions: Heat with 8 ml of dimethyl formamide for 1 hr. at 90° C. with stirring.

Work-up: Dissolve in 200 ml ether; wash soln. with HCl (10% aq.) and with water; dry ($MgSO_4$); evaporate volatiles in vacuo.

Intermediate: Fluorinated bis(N-N-disubstituted amide) of pyromellitic acid (58 g)
Properties: m.p. 60°-95° C.; milliequiv. COOH/gm=1.302, theory=1.317; structure confirmed by infrared spectrogram, nmr, and analysis for C, H, and F.
Reaction B: Intermediate+ethylene oxide (slight excess) (20.1 g, 0.0128 mol)
Conditions: Triethyl amine (0.0015 mol) as catalyst in 11 ml of dimethyl formamide solvent at 49° C.
Work-up: As in Ex. 1.
Product: About 21 g of the desired bis(N-N-disubstituted amide) of pyromellitic acid di(hydroxyethyl) ester as confirmed by IR spectrogram, elemental analysis for C and H, and by alcoholic KOH titration (no —COOH).

Examples XI–XV below illustrate use of our agents to impart soil release properties to thermoplastics. In the examples, PET is polyethylene terephthalate, N-6 is nylon-6, i.e. fiber-forming poly(E-caproamide), and N-66 is nylon-66, i.e. fiber forming poly(hexamethylene adipamide).

EXAMPLE XI

Incorporation of Compounds with PET Fiber, Using Solutions

To incorporate the test compounds with fibers, samples of cloth (fine weave) from PET yarn are immersed for 2 minutes in a dioxane solution of the compound having concentration such that the air dried fabric, after annealing for 3 minutes in a circulating air oven at 180° C., has fluorine content as shown in Table 1. The oil repellency, after given numbers of HL (home laundering) cycles, is determined on a scale of 0 to 8 by use of eight test liquids of surface energies 32.8 dynes/cm (rating=1) down to 20.0 dynes/cm (rating=8). The rating for the compound is that of the highest rated liquid which does not wet a sample of cloth incorporating the compound. (American Association of Textile Colorists and Chemists, Test No. 118-1966).

Table 1

| Run No. | Compound No. | %F Content of Cloth | Oil Repellency |
|---|---|---|---|
| 1. | 3 | 0.15 | 5 |
| 2. | 4 | 0.15 | 6 |
| 3. | 5 | 0.15 | 6 |
| 4. | 7 | 0.15 | 7 |
| 5. | 1 | 0.15 | 4 |
| 6. | 11 | 0.10 | 4 |
| 7. | 11(a) (para) | 0.10 | 1 |
| 8. | 11(b) (meta) | 0.10 | 4 |
| 9. | 16 | 0.10 | 5 |
| 10. | 20 | 0.15 | 6 |
| 11. | none | 0.15 | 0 |

EXAMPLE XII

Incorporation of Compounds with Polycaproamide Fiber Using Solution; Subsequent Dyeing Samples of taffeta weave cloth made from nylon-6 are immersed in acetone or isopropanol solutions of compounds as shown below, to add 0.5% by weight of the compound using the procedure of Example XI but with 0.5 hr. annealing; then are subjected to standard home laundering ("HL") cycles and tested. Test results are given in Table 2 (A), (B) Parts, (C), D and (E) with modifications in the tests as below noted.

In Table 2 below, "HL" designates a standard home laundering procedure. Each cycle consists of a washing in a heavy duty 6-cycle automatic washer using a 12-minute hot (40° C.) wash with one cup of detergent (DASH of Procter & Gamble Co.) at load of 3 pounds with double rinse, followed by drying for 30 minutes in an automatic dryer at 80°-85° C.

Table 2

| (A) Run No. | Compound No. | Anneal Temp. (°C.) | Oil Repellencies After HL Cycles No. of Cycles | | | | | | | |
|---|---|---|---|---|---|---|---|---|---|---|
| | | | 0 | 1 | 6 | 8 | 10 | 12 | 13 | 14 |
| 1 | 2 | 150 | 6 | 6 | 4 | 2 | discontinued | | | |
| 2 | 15 | 150 | 5 | 4 | 4 | 4 | 4 | 4 | 4 | 4 |
| 3 | 16 | 150 | 6 | 6 | 5 | 5 | 5 | 4 | 2 | 2 |
| 4 | 20 | 140 | 7 | 7 | 6 | 5 | 5 | dis-continued | | |
| 5 | 24 | 140 | 7 | 7 | 5 | 4 | 2 | dis-continued | | |
| 6 | Ex. VIII above; n=5:30% n=7.50% n=9.20% | 140 | 6 | 6 | 6 | 5 | | dis-continued | | |
| 7 | 22 | 160 | 7 | 6 | 5 | 5 | 5 | — | — | 5 |

(B) A sample as in Run No. 2 (oxford weave nylon-6) is subjected to an abrasion test. After abrasion, the oil repellency is rated at 5. The abrasion is in a crock meter, type CM-5 (Atlas Electric Devices Co.) wherein sandpaper (WET OR DRY Tri-M-ite 600A siliconcarbide of 3M Co.) bears against stretched fabric for 20 strokes.

(C) Samples as in Run No. 4 (oxford weave nylon-6) are dyed at 100° C. for 1 hour with an acid blue dye (C.I. Acid Blue 45) in an aqueous sodium acetate/acetic acid solution of pH 4.5-5.0; and are tested as in Part (A). No migration of test compounds is observed from the treated samples in the dye bath to untreated samples; and the treated samples, after dyeing, show at least as good retention of oil repellency as treated, undyed samples. The desired color and shade are obtained in the dyeing operation.

(D) At 0.25% of added compound (No. 20), the same results as in Run No. 4 are obtained out to 6 cycles, and rating of "4" after 8 and 10 cycles. At 0.1% added, the initial rating is "5", and reaches "4" after the third HL cycle.

(E) In dyeing tests as in Part (C) above, using 0.25% of added compound No. 20, the rating is "7" (as in Run 4) for 0 and 1 cycle; "5" for 6 and 8 cycles; and "4" for 10 cycles. Using 0.1% of compound No. 20, the first two ratings are "5" and rating after 3 cycles is "4" and was "1" after 6 cycles.

EXAMPLE XIII—INCORPORATION OF COMPOUNDS WITH PET FIBER USING DIOXANE SOLUTION

Fine weave PET cloth is immersed in dioxane solution of additive, at concentration to incorporate additive at 0.15% by weight of fluorine on weight of the fabric, then is annealed in a circulating air oven for about 5 minutes. The tests are summarized in Table 3 below. Note:

DC (dry cleaning) cycles are in a Launder-Ometer automatic washer with perchloroethylene and steel balls, per American Association of Textile Colorists and Chemists test AATCC No. 86-1970; no detergent. Oil repellency as in Ex. XI (AATCC Test No. 118-1966). HL=home laundry cycles by standard procedure (See. Ex. XII). Water repellency is by a spray test, AATCC Test No. 22-1967. A rating of 70 is good, and 90 to 100 is outstanding.

Table 3

| Run No. | Compound No. | Anneal Temp. (°C.) | Repellency After Stated No. of Cycles (DC,HL) No. of Cycles | | | | | |
|---|---|---|---|---|---|---|---|---|
| | | | 0 | 1 | 4 | 6 | 8 | 10 |
| 1. | 18 | 210 | 6 | — | — | 5 | Discontinued | Oil (DC cycles) |
| 2. | " | 230 | 5 | — | — | 5 | Discontinued | |
| 3. | " | 210 | 6 | — | — | 4 (5 cycles) | — | 4-Oil (HL cycles) |
| 4. | " | 230 | 80 | — | 70 | 70 | 70 disc.-Water (DC cycles) | |
| 5. | " | 230 | 80 | — | — | 80 (5 cycles) | Disc. - Water (HL cycles) | |
| 6. | 20 | 210 | 6 | — | 0 | (3 cycles) Disc. | | Oil (DC cycles) |
| 7. | " | 230 | 6 | — | 0 | (3 cycles) Disc. | | |
| 8. | " | 210 | 6 | — | — | 5 (5 cycles) | — | 4-Oil (HL cycles) |
| 9. | " | 230 | 80 | — | 0 | (3 cycles) Disc. - Water (DC cycles) | | |
| 10. | " | 230 | 80 | — | — | 80 (5 cycles) | Disc. - Water (HL cycles) | |
| 11. | 7 | 180 | 7 | — | 0 | (3 cycles) Disc. | | Oil (DC cycles) |
| 12. | " | 210 | 6 | — | 0 | (3 cycles) Disc. | | |
| 13. | " | 230 | 5 | — | 4 | (3 cycles) Disc. | | |
| 14. | " | 180 | 7 | — | — | 6 (5 cycles) | — | 4 |
| 15. | " | 210 | 6 | — | — | 4 (5 cycles) | — | 0 Oil (HL cycles) |
| 16. | " | 230 | 5 | — | — | 2 (5 cycles) Disc. | | |
| 17. | " | 230 | 80 | — | 80 | (3 cycles) Disc. - Water (DC cycles) | | |
| 18. | " | 230 | 80 | — | — | 80 (5 cycles) | Disc.-Water (HL cycles) | |

EXAMPLE XIV—USE OF TRIEPOXIDE

Compound NO. 14 (0.3 g) dissolved in dioxane (100 ml) is applied to (A) PET cloth, (B) N-6 (nylon-6) and (C) N-66 (nylon-66) cloth, by immersion of the cloth in the solution containing 0.09 g of tri-n-butylamine catalyst and 0.1 g triglycidyl trimellitate, drying and annealing at 160° C.; 5 minutes for cloth (A), and 0.5 hr. for cloth (B) and (C).

The triglycidyl compound is obtained by esterifying trimellitic acid trichloride with allyl alcohol, and converting the double bonds to epoxy groups by oxidizing with m-chloroperbenzoic acid in dichloromethane at room temperature for 3 days.

The conditions are chosen to give F content in the resulting treated cloth of 0.14%. The cloth is subjected to standard dry cleaning cycles ("DC") using perchloroethylene (AATCC Test No. 86 - 1970), and also to standard home laundering ("HL") cycles as described for Ex. XII above. Oil repellency ratings (as described in Ex. XI) are shown in Table 4 for the treated samples after the dry cleanings and the launderings, respectively.

Table 4

Oil Repellency Using Triepoxide (A) PET Cloth

| | No. of DC or HL Cycles | | | | | | | |
|---|---|---|---|---|---|---|---|---|
| | 0 | 1 | 2 | 3 | 4 | 5 | 10 | 11 | 18 |
| DC | 6 | 5 | 5 | 5 | 4 | 4 | 4 | 4 | 4 |
| HL | 6 | 6 | 5 | 5 | 4 | 4 | 4 | 2 | — |

(B) N-6 Cloth

| | No. of DC or HL Cycles | | | | | | | | | | |
|---|---|---|---|---|---|---|---|---|---|---|---|
| | 0 | 1 | 2 | 3 | 4 | 5 | 8 | 10 | 13 | 18 | 19 | 20 |
| DC | 7 | 6 | 6 | 6 | 5 | 5 | 5 | 5 | 5 | 5 | — | — |
| HL | 6 | 6 | 6 | 6 | 6 | 6 | 5 | 5 | 5 | 5 | 5 | 2 |

(C) N-66 Cloth

| | No. of DC or HL Cycles | | | | | | | | | | |
|---|---|---|---|---|---|---|---|---|---|---|---|
| | 0 | 1 | 2 | 3 | 4 | 5 | 6 | 8 | 10 | 13 | 18 | 19 |
| DC | 7 | 6 | 5 | 5 | 4 | 4 | 2 | — | — | — | — | — |
| HL | 6 | 6 | 6 | 6 | 6 | 6 | 5 | 5 | 4 | 4 | 4 | 2 |

Water repellency of samples of the above treated N-6 cloth and treated N-66 cloth, tested by AATCC Test No. 22 - 1967), shows rating of 100, i.e. maximum of the scale, both initially and in tests after 5 standard dry cleaning (DC) cycles and after 5 standard home laundering (HL) cycles.

EXAMPLE XV - INCORPORATION OF COMPOUND NO. 28 WITH POLYCAPROAMIDE FIBER, USING SOLUTIONS

Solutions of Compound No. 28 (somewhat turbid) were formed in acetone (room temp.) and in isopropanol (50° C., 2 hours heating) at 1.1% by weight concentrations.

Swatches of nylon-6 oxford cloth were dipped in the solutions: A=air dried at room temp.; B=air dried at room temp. 1 hour, then annealed 30 minutes in air circulating oven at 140° C.

Oil repellencies (see Ex. XI) after standard home laundry cycles (see Ex. XII) are shown in Table 5 below.

Table 5

| Compound No. 28 Sample | Anneal Temp °C. (Time) | Oil Repellencies After HL cycles No. of Cycles | | | | | | |
|---|---|---|---|---|---|---|---|---|
| | | 0 | 1 | 2 | 3 | 4 | 5 | 6 |
| A (acetone) | None | 8 | 4 | 0 | Discontinued | | | |
| A (isopropanol) | None | 8 | 5 | 5 | 2 | 1 | 0 | 1 |
| B (acetone) | 140 (30 min) | 8 | 6 | 6 | 4 | 3 | 2 | 2 |
| B (isopropanol) | 140 (30 min) | 8 | 6 | 6 | 4 | 2 | 1 | 0 |

It will be noted that this Compound No. 28, even without annealing, initially gave the maximum rating of the scale, i.e. 8, for oil repellency; but had comparatively low stability to laundering, which was improved by annealing at 140° C., to the point that substantial repellency was retained after three standard home laundry cycles. Such durability is satisfactory for uses such as carpets in which cleaning involves less severe abrasion than that encountered in the standard home laundering operation.

We claim:

1. A compound having the formula

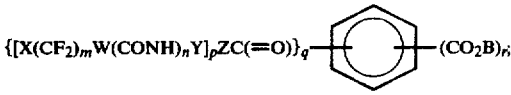

wherein the attachment of the fluorinated radicals and the radicals $CO_2B$ to the nucleus is in asymmetrical positions with respect to rotation about the axis through the center of the nucleus; wherein "X" is fluorine, or perfluoroalkoxy of 1 to 6 carbon atoms, and m has arithmetic mean between 2 and 20; n is zero or unity; "W" and "Y" are alkylene, cycloalkylene or alkyleneoxy radicals of combined chain length from 2 to 20 atoms; $(CF_2)_m$ and "Y" have each at least 2 carbon atoms in the main chain; "Z" is oxygen and p is 1, or "Z" is nitrogen and p is 2; q is an integer of at least 2 but not greater than 5; "B" is $CH_2RCHOH$ or is $CH_2RCHOCH_2RCHOH$ where "R" is hydrogen or methyl, or "B" is $CH_2CH(OH)CH_2Q$ where Q is halogen, hydroxy, or nitrile; or "B" is $CH_2CH(OH)CH_2OCH_2CH(OH)CH_2Q$; and r is an integer of at least 1 but not greater than q; and $X(CF_2)_m$, W and Y are straight chains, branched chains or cyclic; and wherein the substituent chains of the active general formulas are the same or different; said compound being capable, upon contact thereof—as a solution or dispersion—with fibers of polyethylene terephthalate or of nylon and heating, of imparting water and oil repellency to such fibers.

2. Compound of claim 1 being a trimellitate, a pyromellitate, or a bis(N-N-disubstituted amide)/ester of trimellitic acid or of pyromellitic acid, wherein each fluorinated radical, of formula $X(CF_2)_mW(CONH)_nY$, has a main chain contacting at least six carbon atoms and contains at least four perfluorinated carbon atoms in the radical.

3. Compound of claim 2 wherein the fluorinated moiety in said fluorinated radicals has formula $CF_3(CF_2)_m$ or $(CF_3)_2CFO(CF_2)_{m'}$, m having independently at each occurrence any value from 5 to 9 and m' having independently at each occurrence any value from 2 to 16, $(CF_2)_m$ and $(CF_2)_{m'}$ being straight chains; and wherein said B radicals are $CH_2CH_2OH$, $CH_2CH(OH)CH_2Cl$, $CH_2CH(OH)CH_2OH$ or $CH_2CH(OH)CH_2Br$.

4. Compound of claim 2 being a mixture of para and meta substituted pyromellitic acid position isomers wherein overall the two fluorinated radicals have the same formula and the two radicals B have the same formula.

5. Compound of claim 1 wherein said compound is a pyromellitate; wherein said fluorinated radicals have formula $CF_3(CF_2)_mCH_2CH_2$ with m being independently at each occurrence an integer from 5 to 9 or formula $(CF_3)_2CFO(CF_2)_{m'}CH_2CH_2$ with m' being independently at each occurrence an integer from 2 to 16; wherein $(CF_2)_m$ and $(CF_2)_{m'}$ are straight chains; and wherein said B radicals have formula $CH_2CH_2OH$, $CH_2CH(OH)CH_2Cl$, $CH_2CH(OH)CH_2OH$ or $CH_2CH(OH)CH_2Br$.

6. Compound of claim 5 wherein said pyromellitate is the metal isomer and m is 5 to 9 or m' is 2 or 4.

7. A polyethylene terephthalate or nylon fiber having incorporated therewith a compound of claim 1.

8. A polyethylene terephthalate or nylon fiber having incorporated therewith a compound of claim 3.

9. A polyethylene terephthalate or nylon fiber having incorporated therewith a compound of claim 5.

10. A nylon-6 fiber having incorporated therewith a compound of claim 1.

11. A nylon-6 fiber having incorporated therewith a compound of claim 3.

12. A nylon-6 fiber having incorporated therewith a compound of claim 6.

13. A nylon-66 fiber having incorporated therewith a compound of claim 1.

14. A nylon-6 fiber having incorporated therewith a compound of claim 3.

15. A nylon-6 fiber having incorporated therewith a compound of claim 6.

* * * * *